United States Patent [19]

Anderson

[11] 4,231,420
[45] Nov. 4, 1980

[54] HEAT EXCHANGER WITH CONTROLS THEREFOR

[75] Inventor: J. Hilbert Anderson, York, Pa.

[73] Assignee: Sea Solar Power, York, Pa.

[21] Appl. No.: 962,104

[22] Filed: Nov. 20, 1978

[51] Int. Cl.³ .......................... B60H 1/00; F28F 7/00; F28F 3/00; F25B 41/04

[52] U.S. Cl. ...................................... 165/40; 165/76; 165/166; 417/182.5

[58] Field of Search ...................... 165/40, 76, 81, 82, 165/83, 166; 62/218; 417/182.5, 183

[56] References Cited

U.S. PATENT DOCUMENTS

| 2,132,932 | 10/1938 | Boileau et al. | 62/218 |
| 2,595,308 | 5/1952 | Simpelaar | 165/76 |
| 3,542,124 | 11/1970 | Manfredo et al | 165/166 |
| 3,633,661 | 1/1972 | Duncan et al. | 165/166 X |
| 3,986,549 | 10/1976 | Huggins et al. | 165/82 |

Primary Examiner—Albert W. Davis
Assistant Examiner—Margaret A. Focarino
Attorney, Agent, or Firm—Kemon & Estabrook

[57] ABSTRACT

A heat exchanger fabricated from a plurality of plates arranged in spaced parallel relation with one another as a stack or assembly that is positioned between pressure plates. The stack of plates are arranged to define fluid and vapor passages with the entire assembly, including cover members, being held together by suitable clamp plates. A flow control element is positioned in the exchanger to control the flow of the incoming liquid, as well as any recirculating liquid, in the delivery of said liquid to the boiling passages.

20 Claims, 3 Drawing Figures

HEAT EXCHANGER WITH CONTROLS THEREFOR

BACKGROUND OF THE INVENTION

The present invention is directed to heat exchangers of the type utilizing a liquid to effect a transfer of heat to another liquid and the vaporization of the second liquid.

In heat exchangers of the prior art a liquid is delivered to the boiling passages where, as a result of a heat transfer, a vapor is produced. In many instances the liquid delivered to the boiling passages is not completely vaporized in its entirety nor is any provision made for recirculating the unvaporized portion of the liquid.

In applicant's copending applications Ser. No. 846,318, filed Oct. 28, 1977, now U.S. Pat. No. 4,139,054 and Ser. No. 846,319 filed Oct. 28, 1977, now Pat. No. 4,159,735 there are disclosed heat exchangers with controls. The disclosure in application Ser. No. 846,319 shows a float control wherein vapor entrained liquid is collected, and under the action of a float, a portion of said liquid is mixed with incoming liquid. The control system shown in application Ser. No. 846,318 is similar in many respects to the present disclosure, but the present disclosure is regarded as an improvement over application Ser. No. 846,318.

SUMMARY OF THE INVENTION

The present invention is directed to a heat exchanger of the multiple plate type and the controls for operating same.

The heat exchanger of the present application is divided into a plurality of compartments or chambers with the various compartments or chambers being arranged to receive incoming liquid or to effect the boiling of said liquid and its recirculation.

The liquid that is collected above the boiling passages consists mainly of large bubbles and froth and will have quite a variable density in view of the fact that it is in a large part a vapor rather than a liquid. Thus, it becomes highly desirable to provide a flow control that can effectively sense the level of the liquid vapor froth combination in a more efficient manner than can known prior devices, such as a float ball.

DESCRIPTION OF THE PREFERRED EMBODIMENT

Figure 1:
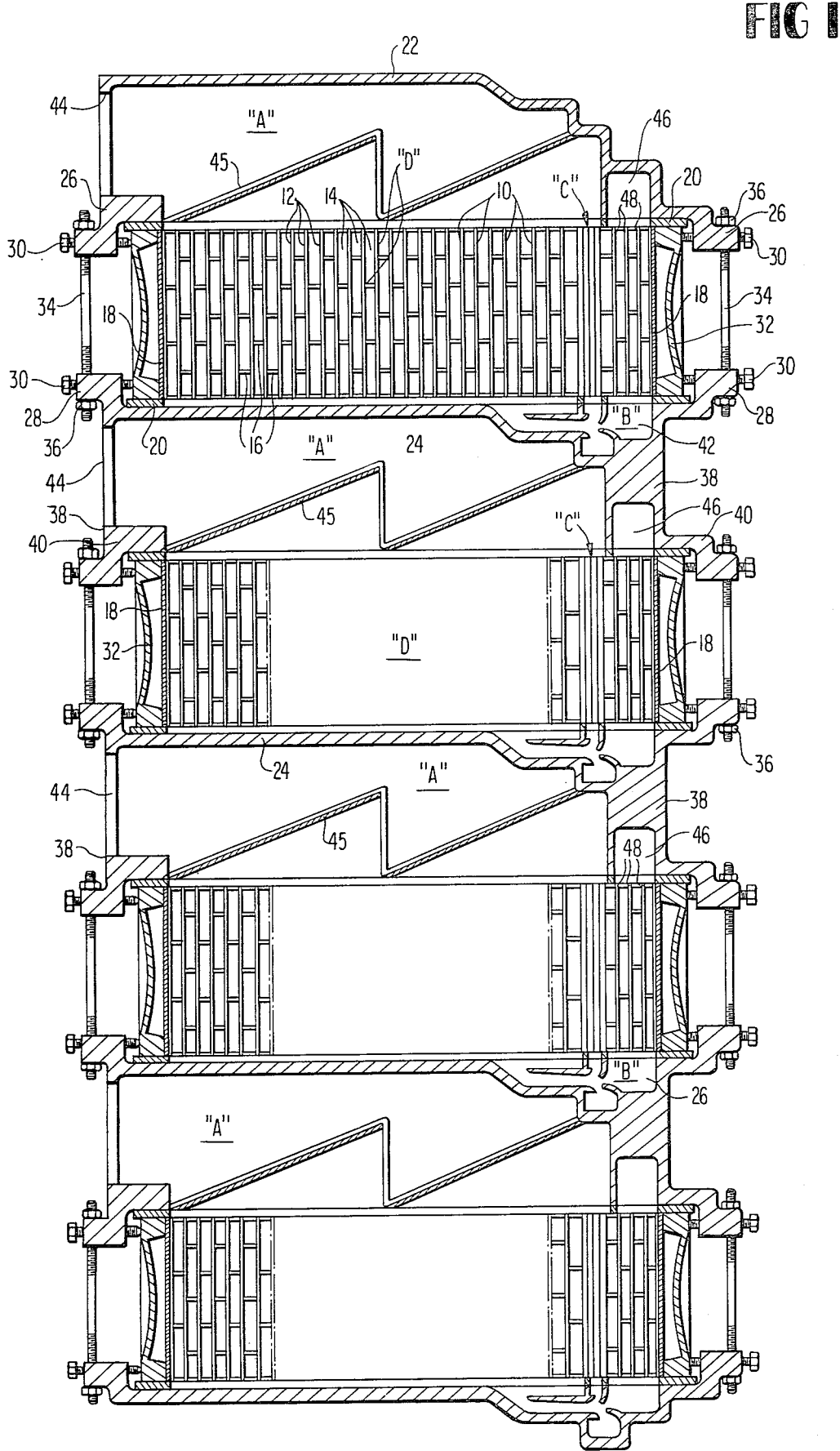
FIG. 1 is a vertical sectional view of a typical boiler module or unit consisting of a plurality of heat exchangers stacked one on top of each other.

As shown in FIG. 1 the heat exchanger is a liquid evaporator or boiler and consists of a plurality of plate members 10 that are assembled in a stack. The plate members 10 are arranged in pairs so as to define between adjacent pairs vapor passageways 12 with water passages 14 provided between the plates of each pair. The passages 14 as defined by the plate members 10 have a plurality of separator strips or plates 16 arranged in horizontal planes therein to define a plurality of the horizontal water passages 14. The plate members 10 are assembled in a stack form between pressure plates 18, the ends of which have gasket flanges 20 positioned thereon and against the edges of the plate members 10. The surfaces of the gasket flanges which engage or abut the edges of the plate members 10 are provided with grooves, not shown, for effectively sealing the edges of said plate members to said gaskets.

The plate members 10 in conjunction with the pressure plates 18 constitute a heat exchanger and, as illustrated in FIG. 1, a boiler module or unit may consist of four heat exchangers stacked on top of each other as a single assembly. The single assembly is provided with a top cover member 22, and each heat exchanger unit of the assembly is supported or carried by a bottom cover member 24. The top cover member 22 is formed at each end with an offset lug 26, and the bottom cover member 24 is formed at each end with an offset lug 28. The offset lugs 26 and 28 have bolts 30 threaded therethrough that engage the enlarged edge portions of the cover members 32 that are positioned between the top and bottom gasket flanges 20 and which abut the pressure plates 18. Thus, as the bolts 30 are tightened, the inner ends of said bolts engage the enlarged edge portions of the cover members 32 for forcing same against the pressure plates 18 and the stack of plate members 10, thereby compressing the plate members 10 towards one another. The offset lugs 26 and 28 are also provided with bolts 34 that have nuts 36 threaded thereon for drawing the cover members towards one another. Thus, each heat exchanger unit as well as the entire assembly is under horizontal compression through said plate members and pressure plates and end covers due to the tightening of the bolts 30 while at the same time the assembly or each heat exchanger unit is under vertical compression by means of the bolts 34 being tightened by the nuts 36 in conjunction with the lugs 26 and 28.

The bottom cover member 24, for each heat exchange unit of the assembly except the bottom unit, is formed at each end with a depending web or segment 38 that terminates in an offset lug or projection 40. The segment 38 at one end of the bottom cover member 24 has a compartment 42 formed therein while the segment 38 at the other end of the bottom cover is formed with an outlet aperture 44. In the boiler module or unit illustrated in FIG. 1, the bottom cover member 24 for the second, third and fourth heat exchange unit or assembly also acts as the top cover member for the first, second and third heat exchange unit or assembly. Thus, in the foregoing arrangement the bottom cover members 24 function as a top cover member for each of the subjacent heat exchange units. In this manner, the cover member 24 defines a vapor outlet section or compartment "A" in the same manner that the top cover 22 defines a vapor outlet compartment "A" for the fourth or uppermost heat exchange unit. Each vapor outlet compartment is provided with an outlet opening 44, and each compartment "A" is provided with an eliminator screen 45 which is adapted to catch liquid droplets and drain them back to the top of the stacked plate members 10 rather than allowing said liquid droplets to move through the compartment "A" and out of the vapor outlet opening 44.

The top cover member 22 as well as the depending end segments 38 of the bottom cover members 24 are each provided with an inlet opening or passage 46 that communicates with channels 48 which are defined by the plate members 10 being arranged into section "B."

In addition, the plate members 10 are arranged or formed into sections "C" and "D." It is to be noted that the channels 48 provide communication with the inlet opening or passage 46 and the compartment 42 while section "C" provides communication between the outlet section or compartment "A" and the compartment defined by the bottom cover member 24, while the section "D" provides communication between the outlet section "A" and the bottom cover 24. It is to be further noted that in the section "C," the passageways are formed without separator strips or plates 16 so that there is less contact with heat transfer members than there would be in the passageways 12 in section "D" of said heat exchanger.

If we arrange the condensers from the turbine exhaust in a sea thermal power plant above the boilers, then it is possible to have the liquid flow from the condensers to the boilers by gravity, and no pump would be required. However, the pressure of the liquid entering the boiler is then a function of the height between the condenser and the evaporator. There is shown in FIG. 1 a stack of boilers which is in actual practice about 18 feet high so that the level of the bottom boiler unit is roughly 16 or 18 feet below that of the upper unit. Thus, the pressure of the liquid flowing in would be much higher for the lower unit than it would be for the upper unit. For this reason it is advisable to connect the condensers in like fashion above each other as are the boilers, and then connect the top condensers to the top evaporators and the lower condensers to the lower evaporators so that the liquid head is very closely the same between each set of condensers and boilers. As shown in FIG. 1, separate liquid pipes are provided for the lower boilers and for the upper boilers so that the foregoing purpose is accomplished by having a different set of liquid pipes for the lower boilers than for the upper boilers, and in this way the height of the liquid leg can be fully utilized to force liquid into the boiler at approximately the same pressure in each case. This arrangement would result in an overall saving in the required height of the liquid to force liquid from the condensers to the boilers and thereby improve plant efficiency. Thus, as shown in FIG. 1, liquid is delivered to the inlet opening or passage 46 of each of the heat exchange units or boilers, and same flows through the channels 48 in section "B" to where it enters the compartment 42 provided in the bottom cover member 24.

Figures 2, 3:
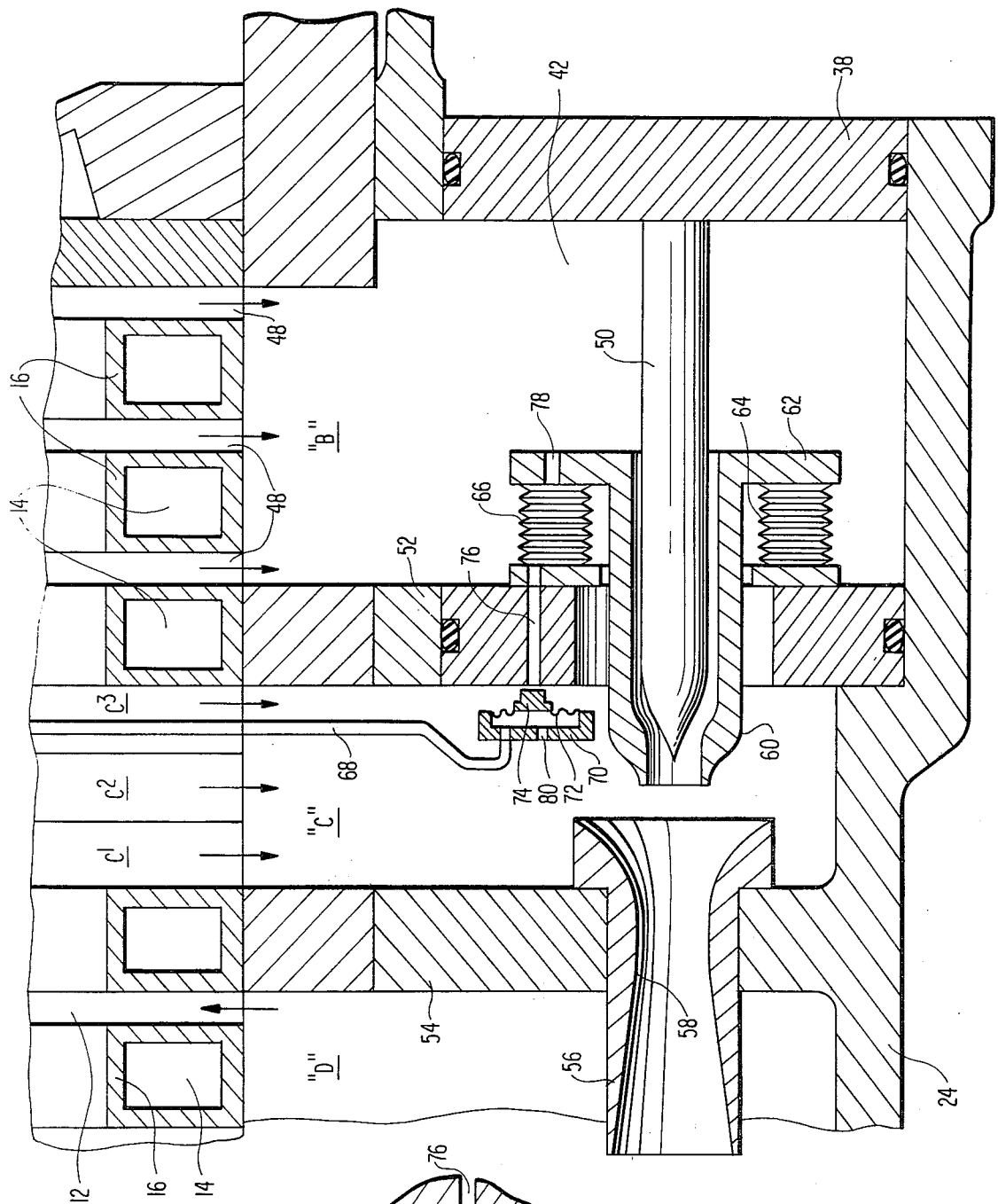
FIG. 2 is a vertical sectional view of a control assembly for use with a boiler unit of FIG. 1.
FIG. 3 is a detailed elevational view, partly in section, of a portion of a modified control.

There is shown in FIG. 2 mechanism for controlling the flow of liquid to the boiling plate section "D." It should be borne in mind that it is necessary to control the flow of liquid moving through the channels in section "B" and into and through the boiling section "D" as the boiling surfaces of the plate members in section "D" over which the liquid is flowing should be completely wetted to the top of the passageways 12 in order to obtain high rates of heat transfer. However, if excessive liquid is carried through the boiling passageways 12, then it will not only overflow into the passageways in section "C" that communicates with the compartment defined by the bottom cover 24, but the level above the boiling passageways 12 may become too high so that some of the liquid could very readily be carried over with the vapor and through the vapor outlet opening 44 in spite of the screen eliminators 45. The level of the liquid in compartment "A" above the plate members 10 is going to be largely bubbles and froth, and same will have quite a variable density due to the fact that it is in a large part vapor rather than liquid. There is shown in FIG. 2 a flow control mechanism that is capable of sensing the level of the liquid vapor froth combination and which will control the flow to the boiling channels or passageways 12 in the section "D."

The liquid flowing through the inlet opening or passage 46 will flow through the channels 48 in section "B" into the compartment 42. The compartment 42 is provided with a valve plug member 50 that is carried by the end segment 38 of the bottom cover member 24 and which valve plug member projects through an opening provided in a partition 52 interposed between the sections "B" and "C." There is also provided in the compartment 42 a partition 54 between the sections "C" and "D," and this partition has provided therein a jet pump diffuser 56 having a pump throat area 58 that is in aligned relation with the tip of the valve plug member 50. The valve plug 50 has associated therewith an adjustable nozzle member 60 which is provided at its inner ends with radial flange elements 62 which have mounted thereon inner and outer bellows 64 and 66 respectively. Thus, the degree or intensity of flow of liquid through the nozzle member 60 will be controlled by moving the nozzle member 60 with respect to the valve plug member 50. The movement of the nozzle member is effected by the bellows 64 and 66 as an increase of pressure in the bellows causes the nozzle to move to the right thereby closing the valve with respect to the valve plug member and reducing the flow of liquid through the valve member. On the other hand, if the pressure within the bellows is decreased, the nozzle will move to the left and open the valve member 60 with respect to the valve plug 50, thereby increasing the flow of liquid through the nozzle.

The section "C" is shown, for purposes of illustration, as consisting of three channels C1, C2 and C3, but more channels could be employed depending upon the size of the boiler being used. The liquid emanating from the passageways 12 in section "D" overflows in the compartment "A" at the top of the passageways 12, and said liquid will flow into the channels C1, C2 and C3 from which it would be drawn into the pump throat 58 and recirculated up through the boiler again by the incoming jet of high pressure liquid which has come down through the liquid heating channels 48 in section "B" into the compartment 42. Since channel C1 is immediately adjacent to the overflowing liquid from the passageways 12 in section "D," whereas channel C3 is further removed, it is only natural that with low levels of liquid above the boiling channels of section "D," most of the liquid would flow through channel C1 and would not reach channel C3 which would then be virtually empty. Thus, the overflowing of liquid into channel C3 when the liquid level is increased in compartment "A" can be utilized to control the flow through the inlet nozzle member 60.

There is disclosed in section "C" a vertically extending tube 68 that is open at its upper end and which projects upwardly into channel C3. If channel C3 is full of liquid, then the tube 68 will also be full of liquid. The lower end of the tube 68 has mounted thereon a cap shaped member 70 which has a diaphragm 72 affixed thereto. The diaphragm 72 carries a pilot valve 74 which seats on a variable orifice 76 provided in the partition 52 between the sections "C" and "B." The variable orifice 76 communicates with the cavity of the bellows and the down stream side of the nozzle member of the jet pump while an inlet orifice 78 for the bellows cavity is connected to the high pressure side of the jet pump, and thus, there is a continual flow through the bellows between the inlet orifice 78 and the variable orifice 76. The cup shaped member 70 is formed with a pilot or discharge orifice 80 which will permit any liquid in the tube 68 to flow into the diaphragmmed cup member 70 and out through the orifice 80 when the channel C3 is completely devoid of liquid.

When the channel C3 is full of liquid the tube 68 will be filled with liquid and the pressure on the diaphragm 72 by the liquid contained in the cup 70 will move the pilot valve 74 to the right, in FIG. 2, thus closing the variable orifice 76 causing the pressure in the bellows to build up resulting in the nozzle 60 being moved to the right, in FIG. 2, with respect to the valve plug member 50, thereby closing the nozzle or jet pump opening and reducing the flow of liquid from the compartment 42. On the other hand, if the tube 68 is empty and the pressure behind the diaphragm 72 is, therefore, reduced essentially to the pressure in the suction of the jet pump, then the pilot valve 74 will move to the left, as viewed in FIG. 2, thereby opening the variable orifice 76 and decreasing the pressure within the bellows, thereby causing the nozzle to move to the left and opening the valve in the jet pump and increasing the flow from the compartment 42. This results in an increased flow through the passageways 12 in the section "D" thereby increasing the level of the liquid produced above the channels C1, C2 and C3 so that some flow of the liquid is then generated down through the channel C3 and thus, again, filling the tube 68.

The foregoing tends to provide a simple means for controlling the level of the liquid in the boiler to a satisfactory value in that if the level is too high, it will over flow into channel C3 and into the tube 68 causing the nozzle 60 to reduce the flow of liquid from the compartment 42 to an acceptable value. On the other hand, if the level of liquid is too low, the channel C3 will be empty and the tube will tend to empty and the nozzle will open to admit a greater flow from the compartment 42.

There is shown in FIG. 3 a modified control for the variable orifice 76. This control consists of an angle shaped lever 82 that is pivotally mounted at 84 and terminates in an enlarged end portion 86 that is designed to engage and close the variable orifice 76. The other end of the lever 82 is provided with a projection 88 that is engaged by the lower end of a rod member 90 that is positioned within the channel C3 in lieu of the tube 68. Thus, as channel C3 becomes filled with liquid, the downward force of the rod on the projection 88 of the lever 82 is decreased, because of buoyancy, so that the enlarged end portion 86 of said lever will move into engagement with the variable orifice 76 and close same. On the other hand, if channel C3 is empty, the rod 90 will provide a greater down force on the projection 88 of the lever 82 thus moving the lever about the pivot point 84 and opening the variable orifice 76 by moving the enlarged end portion 86 away from said orifice. In this way the movement of the rod is controlled by the liquid in the channel C3, and the opening of the variable orifice is the same as it would be with regards to the pilot valve 74 and the tube 68.

Although the foregoing description is necessarily of a detailed character in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. A boiler module or unit comprising a heat exchanger having a plurality of plates arranged in pairs in vertical planes and in spaced parallel relation to one another between a pair of pressure plates, each pair of plates defining a passageway therebetween and each pair of plates defining a passage between adjacent pairs of plates, cover members for the top and the bottom of said plates, said cover members terminating in offset projection, fastening means securing said projections to one another in vertical compression and fastening means carried by said projections and engaging said pressure plates for forcing said plates towards one another in horizontal compression.

2. A boiler module or unit as set forth in claim 1 wherein said top cover member is spaced from said plates to define a compartment, an eliminator screen positioned in said compartment.

3. A boiler module or unit as set forth in claim 1 wherein said top cover member is provided with a liquid inlet and a vapor outlet, said top cover member having a portion thereof engaging certain of said plates to divide said plates into a plurality of sections, with one of said sections constituting channels communicating with said liquid inlet, said bottom cover forming a compartment to receive the liquid from said channels and deliver same to said passageways in another section for elevating the temperature of the liquid in the passageways of the last mentioned section by the fluid flowing through the passages of the last mentioned section.

4. A boiler module or unit as set forth in claim 3 wherein said last mentioned section is formed with a plurality of passageways adjacent to said channels.

5. A boiler module or unit as set forth in claim 4 wherein said compartment in said bottom cover is provided with an apertured partition having a valve plug and associated nozzle member projecting partially therethrough with a second partition spaced from the first and having a diffuser therein with a pump throat in alignment with the nozzle member.

6. A boiler module or unit as set forth in claim 5 wherein said first partition has inner and outer bellows mounted thereon and engageable with said nozzle member and a variable orifice provided in said partition and communicating with said bellows to cause said bellows to expand and retract and move the nozzle member towards and away from the valve plug to control the liquid flowing through said diffuser pump throat.

7. A boiler module or unit as set forth in claim 6 wherein one of said plurality of passageways is provided with a liquid receiving tube, said tube having a cup shaped member on the end thereof with a diaphragm affixed thereto and carrying a pilot valve for engaging said variable orifice, said pilot valve engaging said variable orifice and closing same to cause said bellows to expand and move the nozzle member towards said valve plug and restrict the flow of liquid through said nozzle and said diffuser when said passageways and tube are filled with liquid.

8. A boiler module or unit as set forth in claim 7 wherein said nozzle member is formed with an inlet orifice for said bellows which inlet orifice is on the high pressure side of said diffuser pump throat.

9. A boiler module or unit as set forth in claim 8 wherein said cup shaped member is provided with a pilot orifice for draining fluid from said cup shaped member when said tube is empty.

10. A boiler module or unit comprising a plurality of heat exchangers stacked on top of each other as a unitary vertical assembly, each heat exchanger having a plurality of plates arranged in pairs in vertical planes and in spaced parallel relation to one another between a plurality of pressure plates, each pair of plates defining a passageway therebetween and each pair of plates defining a passage between adjacent pairs of plates, a cover member for the top of the uppermost heat exchanger of said stack, a cover member for the bottom of the lowermost heat exchanger of said stack, a cover member for the bottom of each remaining heat exchanger of said stack with said bottom cover constituting top covers for each subjacent heat exchanger of said stack, said top cover and said bottom cover and each intermediate bottom cover terminating in offset projections, fastening means securing said projections to one another in vertical compression and fastening means carried by said projections and engaging said pressure plates for forcing said plates towards one another in horizontal compression contemporaneous with retaining each heat exchanger in an assembled condition.

11. A boiler module or unit as set forth in claim 10 wherein the top cover and the bottom covers of each intermediate unit of said stack are spaced from said plates to define a top compartment having a vapor outlet and a liquid inlet.

12. A boiler module or unit as set forth in claim 11 wherein said top compartment is provided with an eliminator screen.

13. A boiler module or unit as set forth in claim 11 wherein a portion of said top cover and a portion of said bottom cover is configured to engage certain of said plates to divide said plates into a plurality of sections, with one of said sections constituting channels communicating with said inlet, said bottom cover forming a compartment to receive the liquid from said channels and deliver same to said passageways in another section for elevating the temperature of the liquid in the passageways of the last mentioned section by the fluid flowing through the passages of the last mentioned section.

14. A boiler module or unit as set forth in claim 13 wherein said last mentioned section is formed with a plurality of passageways adjacent to said channels.

15. A boiler module or unit as set forth in claim 14 wherein said compartment is provided with an apertured partition having a valve plug and associated nozzle member projecting partially therethrough with a second partition spaced from the first and having a diffuser therein with a pump throat in alignment with the nozzle member.

16. A boiler module or unit as set forth in claim 15 wherein said first partition has inner and outer bellows mounted thereon and engageable with said nozzle member and a variable orifice provided in said partition and communicating with said bellows to cause said bellows to expand and retract and move the nozzle member towards and away from the valve plug to control the liquid flowing through said diffuser pump throat.

17. A boiler module or unit as set forth in claim 16 wherein one of said plurality of passageways is provided with a liquid receiving tube, said tube having a cup shaped member on the end thereof with a diaphragm affixed thereto and carrying a pilot valve for engaging said variable orifice, said pilot valve engaging said variable orifice and closing same to cause said bellows to expand and move the nozzle member towards said valve plug and restrict the flow of liquid through said nozzle and said diffuser when said passageway and tube are filled with liquid.

18. A boiler module or unit as set forth in claim 17 wherein said nozzle member is formed with an inlet orifice for said bellows which inlet orifice is on the high pressure side of said diffuser pump throat.

19. A boiler module or unit as set forth in claim 18 wherein said cup shaped member is provided with a pilot orifice draining fluid from said cup shaped member when said tube is empty.

20. A boiler module or unit as set forth in claim 16 wherein a pivotally mounted lever is provided with an enlarged end portion for engaging said variable orifice and a rod extends into said passageway with an end thereof engaging a projection on said lever, whereby with liquid in said passageway said rod due to buoyancy will enable said lever to pivot and move said end portion into engagement with said orifice causing said bellows to move said nozzle member with respect to said valve plug.

* * * * *